US010129648B1

(12) United States Patent
Hernandez Santisteban et al.

(10) Patent No.: US 10,129,648 B1
(45) Date of Patent: Nov. 13, 2018

(54) HINGED COMPUTING DEVICE FOR BINAURAL RECORDING

(71) Applicant: Microsoft Technology Licensing, LLC, Redmond, WA (US)

(72) Inventors: Adolfo Hernandez Santisteban, Seattle, WA (US); John Benjamin George Hesketh, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/593,044

(22) Filed: May 11, 2017

(51) Int. Cl.
H04R 5/027 (2006.01)
H04R 1/04 (2006.01)
H04S 7/00 (2006.01)
G11B 20/10 (2006.01)

(52) U.S. Cl.
CPC ....... *H04R 5/027* (2013.01); *G11B 20/10527* (2013.01); *H04R 1/04* (2013.01); *H04S 7/30* (2013.01); *G11B 2020/10546* (2013.01); *H04R 2499/11* (2013.01); *H04S 2400/15* (2013.01); *H04S 2420/01* (2013.01); *H04S 2420/11* (2013.01)

(58) Field of Classification Search
CPC ........ H04R 5/027; H04R 3/005; H04R 1/406; H04R 2205/022; H04R 2420/09; H04R 2410/00; H04R 2499/15; H04R 29/004; H04R 3/00; H04R 5/033
See application file for complete search history.

(56) References Cited

U.S. PATENT DOCUMENTS

| | | |
|---|---|---|
| 2007/0009120 A1 | 1/2007 | Algazi et al. |
| 2008/0112113 A1 | 5/2008 | Sawadski et al. |
| 2008/0161061 A1 | 7/2008 | You |
| 2009/0252356 A1 | 10/2009 | Goodwin et al. |
| 2012/0128160 A1 | 5/2012 | Kim et al. |
| 2012/0176535 A1* | 7/2012 | Takeda ............... H04N 13/0239 348/375 |
| 2014/0050326 A1* | 2/2014 | Vesa .................... H04R 5/027 381/26 |
| 2014/0185814 A1* | 7/2014 | Cutler ................... H04R 5/04 381/26 |
| 2015/0110275 A1 | 4/2015 | Tammi et al. |

(Continued)

FOREIGN PATENT DOCUMENTS

JP 2005286718 A 10/2005

OTHER PUBLICATIONS

"HTC U Ultra dual sim", http://www.htc.com/pk/smartphones/htc-u-ultra/, Retrieved on: Mar. 22, 2017, 5 pages.

(Continued)

*Primary Examiner* — Mohammad Islam
(74) *Attorney, Agent, or Firm* — Holzer Patel Drennan (57) ABSTRACT

Conventional stereo audio recordings do not factor in natural ear spacing or "head shadow" of a user's head and ears. The hinged computing devices disclosed herein incorporate a pair of microphones that approximate the user's ear-to-ear spacing and orientation, as well as a physical structure that approximates the user's head shadow. A resulting recording of the computing device's environment may be conditioned and reproduced as a binaural stereo audio feed for selective playback to the user or other users.

20 Claims, 4 Drawing Sheets

(56) References Cited

U.S. PATENT DOCUMENTS

| | | |
|---|---|---|
| 2015/0116364 A1 | 4/2015 | Aurongzeb et al. |
| 2016/0005408 A1 | 1/2016 | Visser et al. |
| 2016/0066074 A1* | 3/2016 | Iori .................. H04R 5/027 |
| | | 381/26 |
| 2016/0183009 A1* | 6/2016 | Kim .................. H04R 25/30 |
| | | 381/315 |
| 2016/0299738 A1* | 10/2016 | Makinen ............ H04S 3/002 |
| 2017/0272559 A1* | 9/2017 | Cavallaro ........... H04M 1/0268 |

OTHER PUBLICATIONS

"3Dio Professional Binaural Microphones", https://3diosound.com/, Published on: Dec. 2, 2016, 3 pages.

"CS-10EM Binaural Microphones/Earphones", https://www.roland.com/us/products/cs-10em/features/, retrieved on: May 11, 2017, 6 pages.

"Georg Neumann GmbH—Products/Current Microphones/KU 100/Description", https://www.neumann.com/?lang=en&id=current_microphones&cid=ku100_description, retrieved on: May 11, 2017, 2 pages.

Johnson, Roger, et al., "Comparison of Speech Intelligibility in Artificial Head and Jecklin Disc Recordings", In proceedings of AES Convention 130, May 13, 2011, 9 Pages.

"International Search Report and Written Opinion Issued in PCT Application No. PCT/US2018/028723", dated Jun. 21, 2018, 12 Pages.

\* cited by examiner

HINGED COMPUTING DEVICE FOR BINAURAL RECORDING

BACKGROUND

Binaural recording is a method of recording sound that uses two microphones in a spaced arrangement with the intent to create a 3-D stereo sound sensation for a listener that approximates the experience of actually being in the room with the performers or instruments during the recording. This effect is often created using a technique known as "dummy head recording," where a mannequin head is outfitted with a microphone in or near each ear and placed in the room with the performers or instruments during the recording.

Traditional computing devices having a singular microphone or dual microphones for stereo recording cannot achieve the 3-D stereo sound sensation of binaural recording due to typical relative locations of the microphone(s) within a traditional computing device, lack of a processing system capable of conditioning recorded stereo audio into a binaural audio stream, and limitations of traditional computing device layouts. However, a computing device with a capability to create a binaural recording could be useful to capture recordings of live orchestral or other performances, as well as ambient recordings of city or natural environments.

SUMMARY

Implementations described and claimed herein provide a binaural computing device comprising a first device component including a first microphone, a second device component including a second microphone, and a binaural processing module to receive audio input from the first microphone and the second microphone and generate a binaural audio stream. The second device component is pivotally connected to the first device component and the first microphone and the second microphone are each positioned at a location of the binaural computing device distal from the pivotal connection.

Implementations described and claimed herein further provide a method of using a computing device to create a binaural recording. The method comprises pivoting a first device component with reference to a second device component to create an angle between the first device component and the second device component. The method further comprises recording an audio stream from a first microphone within the first device component and a second microphone within the second device component onto the computing device. The method still further comprises conditioning the recorded audio stream to generate a binaural audio stream.

Implementations described and claimed herein still further provide a computer-readable medium containing processor-executable instructions. When executed by a processor, the instructions cause the processor to record an audio stream from a first microphone within a first device component and a second microphone within a second device component onto a binaural computing device, the first device component pivotally connected to the second device component. The instructions further cause the processor to condition the recorded audio stream to generate a binaural audio stream.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTIONS

Conventional stereo audio recordings do not factor in natural ear spacing or "head shadow" of a user's head and ears. Head shadow occurs naturally as the user listens to his or her surroundings, which generates ITDs (interaural time differences) and ILDs (interaural level differences). The hinged computing devices disclosed herein incorporate a pair of microphones that approximate the user's ear-to-ear spacing and orientation, as well as a physical structure that approximates the user's head shadow. A resulting recording of the computing device's environment may be conditioned and reproduced as a binaural stereo audio feed for selective playback to the user or other users.

Figure 1:
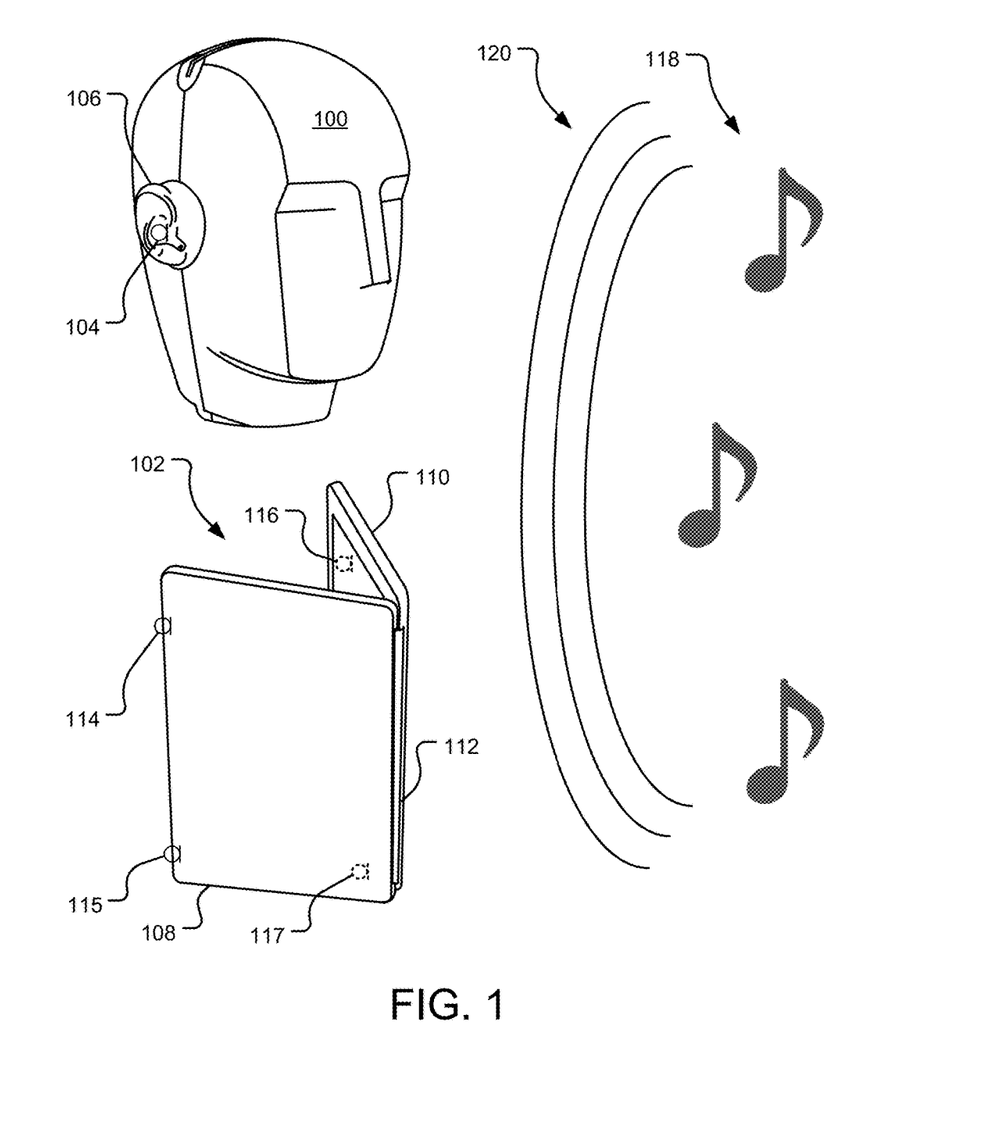
FIG. 1 illustrates a perspective view of a dummy head and an example hinged computing device for binaural recording.

FIG. 1 illustrates a perspective view of a dummy head 100 and first example hinged computing device 102 for binaural recording. The dummy head 100 is often used to conventionally create binaural recordings. A microphone (e.g., microphone 104) is placed within or in close proximity to each ear (e.g., ear 106) of the dummy head 100. The audio environment (illustrated by musical notes 118 and sound waves 120) of the dummy head 100 is then recorded by the microphones. While the audio environment is illustrated as projecting from a singular direction (e.g., right-to-left), a typical audio environment may be quite complex having multiple audio sources with distinct sounds and locations with reference to the dummy head 100.

In an example implementation, the two microphones within the dummy head 100 are high-fidelity omnidirectional microphones spaced approximately 18 cm apart (e.g., an average distance between an average human's ear canals) on opposite sides of the dummy head 100. Each of the microphones are inset in ear-shaped molds to fully capture all audio frequency adjustments that occur naturally as sound wraps around the dummy head 100 and is "shaped" by the form of the outer and inner ear of the molds.

The hinged computing device 102 is illustrated at a similar position and orientation as the dummy head 100 to illustrate similarities between the hinged computing device 102 and the dummy head 100. The hinged computing device 102 includes two device components 108, 110 pivotally connected by a hinge 112. In other implementations, the hinged computing device 102 may include more than the two device components 108, 110 and more than the singular hinge 112. Further, in other computing devices with multiple hinges, the hinges may be orientated about the same axis of rotation and operate in unison, or about different axes of rotation and operate independently.

The device components 108, 110 may each be a display, touchscreen, keyboard, screen cover, or any other component of the hinged computing device 102. As a result, material choice(s) for each of the device components 108, 110 may similarly vary (e.g., plastic, metal alloy, glass, leather, rubber, or any combination thereof). The device components 108, 110 may further contain batteries, circuit boards, power supplies, electronic storage devices, or other electronic components, for example. The hinge 112 may physically and communicatively connect the device components 108, 110, while permitting each device component to be pivoted about a fixed axis with respect to the other device component.

In various implementations, the hinged computing device 102 is a tablet computer, laptop computer, personal computer, gaming device, smart phone, or any other discrete hinged device that carries out one or more specific sets of arithmetic and/or logical operations. The hinge 112 may also take a variety of physical forms, including various sizes and shapes. In some instances, the device components 108, 110 are selectively separable. In other implementations, the overall hinged computing device 102 is flexible and the hinge 112 is a living hinge, which allows the computing device 102 itself to achieve a desired shape.

The hinged computing device 102 includes a pair of high-fidelity omnidirectional microphones (e.g., microphones 114, 116) that approximate the ear-to-ear spacing of the dummy head 100 and/or an intended user of the hinged computing device 102 when the hinged computing device 102 is oriented as shown. Microphone 116 is shown in broken lines as it is hidden in the depicted view of the hinged computing device 102. The microphones 114, 116 are located on their respective device components 108, 110 in similar positions distal and equidistant from the hinge 112.

The microphones 114, 116 may each be physically located on front-facing planar surfaces of the hinged computing device 102 near an edge of the hinged computing device 102 or within the edge itself of the hinged computing device 102. While specific locations of each of the microphones 114, 116 on their respective device components 108, 110 may vary, each of the microphones 114, 116 are located at substantially the same location on their respective device components 108, 110. In an example implementation, the microphones 114, 116 are located approximately 9 to 15 cm from the hinge 112 and approximately 2 to 4 cm from a top edge of the hinged computing device 102. In various implementations, approximate dimensions provided herein may vary by 10% from the given values.

In some implementations, the microphones 114, 116 are oriented in a manner that permits binaural recording with the hinged computing device 102 in a singular angular orientation (or singular range of orientations), as illustrated in FIG. 1. In other implementations, the device components 108, 110 may be pivoted about the hinge 112 approximately 180 degrees and the microphones 114, 116 permit binaural recording from an opposite direction from that shown. In some implementations, the device components 108, 110 may each also include a physical structure around the microphones 114, 116 that approximates a human pinna (not shown).

The microphones 114, 116 may each be powered by and/or communicate with the hinged computing device 102 via wires and/or contacts in the hinge 112, or communicate wirelessly over a variety of available communication standards (e.g., Bluetooth, infrared, near field communication, ultraband, and ZigBee). In various implementations, the microphones 114, 116 may each have its own power supply (e.g., one or more batteries, not shown), be powered from the hinged computing device 102 via the wires and/or contacts in the hinge 112, or be powered wirelessly from the hinged computing device 102 or another power source.

While more than two microphones may be incorporated within the hinged computing device 102, true binaural recording utilizes exactly two microphones. The audio recording and reproduction system chain from each microphone to the user's brain contains a pinna (or a singular microphone) and one head-shadow (e.g., the dummy head 100 or the user's own head). However, in some implementations, a second redundant set of microphones 115, 117 are also located on their respective device components 108, 110 in positions distal and equidistant from the hinge 112. Microphone 117 is shown in broken lines as it is hidden in the depicted view of the hinged computing device 102.

The second set of microphones 115, 117 may have some or all of the features described in detail above with regard to the microphones 114, 116. The second set of microphones 115, 117 provide a redundant set of microphones for binaural recording that may be used when one of the microphones 114, 116 is inadvertently blocked, or when the hinged computing device 102 is rotated in a manner that renders binaural recording via the microphones 115, 117 preferable to the microphones 114, 116 (e.g., the hinged computing device 102 is rotated 180 degrees from that shown, as detected by an orientation sensor within the hinged computing device 102. While the second set of microphones 115, 117 are shown at or near a bottom of the hinged computing device 102 as compared to the microphones 114, 116 (which are shown at or near a top of the hinged computing device 102), physical locations of each of the microphones 114, 115, 116, 117 may vary substantially from that shown.

The hinged computing device 102 is hinged at an angle that creates an overall object shape that approximates a head shadow of the dummy head 100 and/or the user from a front-facing perspective. In various implementations, acceptable angular orientations of the hinge 112 for binaural recorded may range from approximately 180 degrees (i.e., in-line) to 65 degrees between the device components 108, 110. The overall effect is a hinged computing device 102 that approximates the dummy head 100, which in turn approximates the user's head, ears, and eardrums. A resulting recording of the hinged computing device's environment may be processed and reproduced as a binaural stereo audio feed for selective playback to the user.

Figure 2:
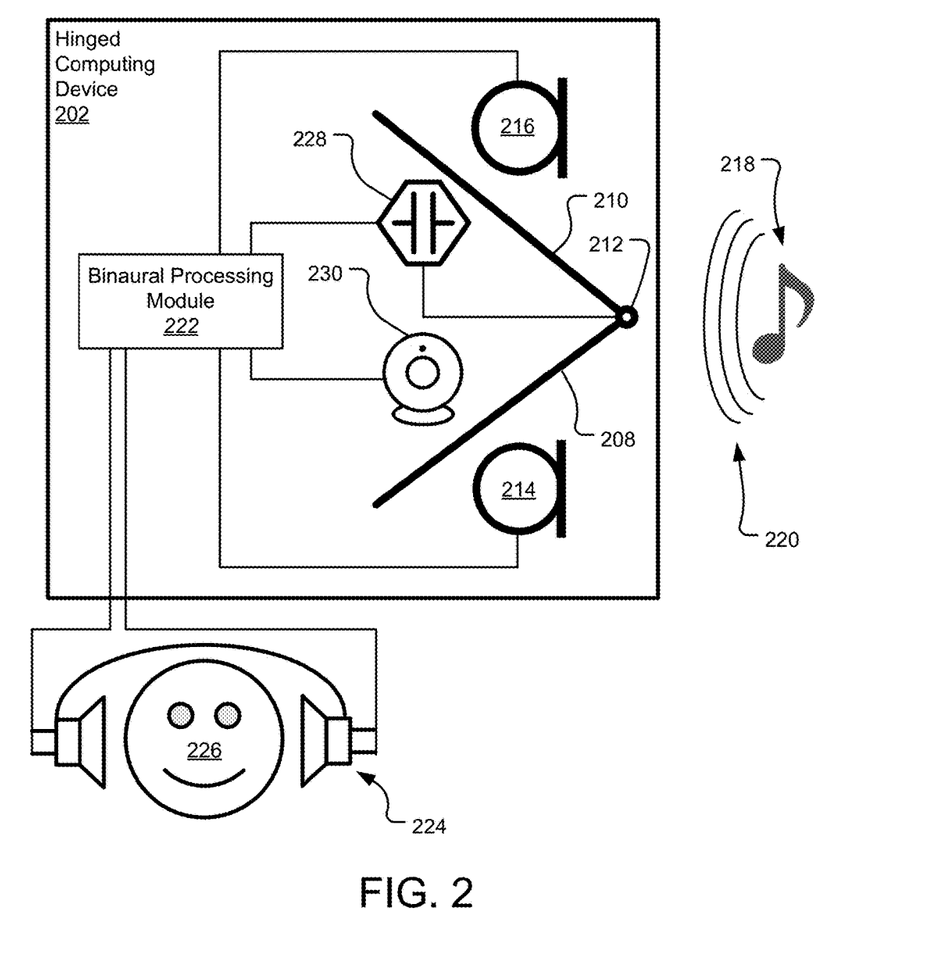
FIG. 2 illustrates a system diagram of an example hinged computing device for binaural recording.

FIG. 2 illustrates a system diagram of an example hinged computing device 202 for binaural recording. The hinged computing device 202 includes two device components 208, 210 pivotally connected by a hinge 212 and a pair of high-fidelity omnidirectional microphones 214, 216. The microphones 214, 216 are located at a similar positions and orientations on a respective one of the device components 208, 210 distal and equidistant from the hinge 212. The microphones 214, 216 approximate ear-to-ear spacing of an intended user 226 of the hinged computing device 202.

Further, the device components 208, 210 are oriented at an angle that creates an overall object shape that approximates the user's head shadow from a front-facing perspective. The overall effect is a hinged computing device 202 that approximates the user's head, ears, and eardrums and surrounding audio environment (illustrated by musical note 218 and sound waves 220) when place in a binaural audio recording position, as shown. The surrounding audio environment is then recorded by the hinged computing device 202 as is if it were the user 226. While the audio environment is illustrated as projecting from a singular direction (e.g., right-to-left), a typical audio environment may be quite complex having multiple audio sources with distinct sounds and locations with reference to the hinged computing device 202.

The hinged computing device 202 further includes a binaural processing module 222 that receives audio input from the microphones 214, 216, as well as other potential inputs, conditions the audio input, and outputs a binaural audio feed. The binaural audio signal is a stereo audio feed intended to be selectively played back on headphones 224 to the user 226 or a different user. While binaural audio is intended to be played back via stereo headphones or a dipole stereo, further processing by the binaural processing module may optionally output a 5.1 surround sound or other surround audio feed with 3 or more channels. For example, the acoustics of binaural audio may distort surround channel separation via natural crosstalk unless the binaural audio is further processed to reduce or eliminate the crosstalk.

The hinged computing device 202 may further include an angular orientation sensor 228 that detects an angular position of the hinge 212 for creating the binaural recording. In one example implementation, the binaural processing module 222 only permits binaural recording when the hinge 212 is oriented within a predefined range deemed acceptable for binaural recording (e.g., 65 to 180 degrees).

The binaural processing module 222 may further adjust the binaural audio signal based on the input angular position of the hinge 212. The adjusting may be static (e.g., adjusted once for a detected angular position at the beginning of an audio recording) or dynamic (e.g., adjusted continuously or periodically multiple times throughout an audio recording as the angular position of the hinge 212 changes). The binaural processing module 222 may still further compare the input angular position of the hinge 212 to a value corresponding to a standard user's head shape or a manually input value corresponding to a specific user's head shape. The binaural processing module 222 may customize the binaural recording for different users by accepting manually input values corresponding to each user's head-shadow.

The hinged computing device 202 may further include a camera 230 (e.g., a rearward-facing camera) to capture one or more user characteristics for customizing the binaural recording for the user 226. For example, the camera 230 may capture one or more images of the user 226 that the binaural processing module 222 uses to create an estimated angle corresponding to the user's head shape. The binaural processing module 222 further compares the estimated angle to the input angular position of the hinge 212 to determine if any adjusting of the binaural audio signal based on the input angular position of the hinge 212 is needed. The binaural processing module 222 may therefore customize the binaural recording for different users by creating an estimated head-shadow angle corresponding to each unique user's head shape.

In some implementations, some or all of the binaural processing module 222 is physically located on the headphones 224. As a result, the audio input from the microphones 214, 216 may be output to the headphones 224 either partially conditioned or unconditioned and the remaining conditioning into a binaural audio feed occurs at the headphones 224 prior to playback to the user 226.

Figure 3:
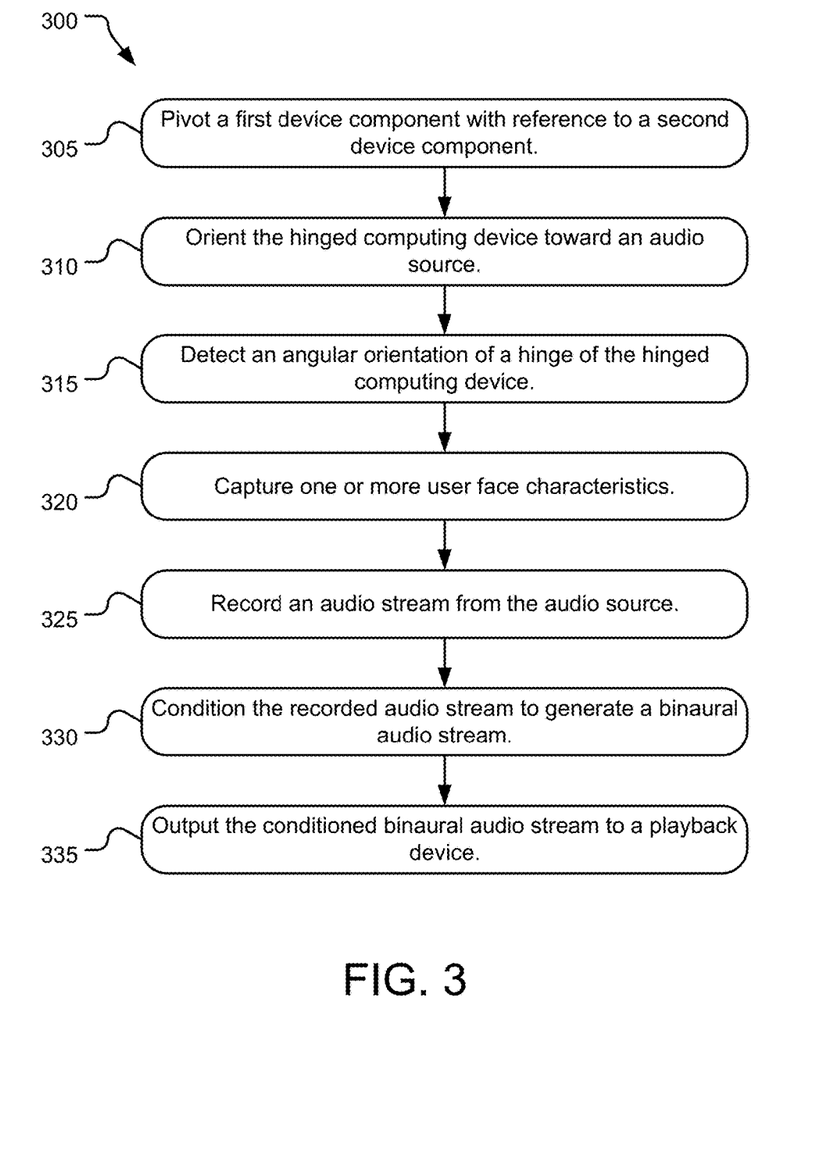
FIG. 3 illustrates example operations for creating a binaural recording using a hinged computing device.

FIG. 3 illustrates example operations 300 for creating a binaural recording using a hinged computing device. A pivoting operation 305 pivots a first device component with reference to a second device component to create an angle between the first device component and the second device component. In various implementations, the pivoting operation 305 may entail opening a hinged computing device from a closed position and setting the angle between the first device component and the second device component within an acceptable range that approximates a user's head shadow and permits binaural recording.

An orienting operation 310 orients the hinged computing device toward an audio source. More specifically, the hinged computing device is oriented such that a hinge between the first device component and the second device component points toward the audio source and each of the first and second device components angle away from the audio source. For example, a user may hold the hinged computing device in front of the user's face or body pointed at the audio source that the user is interested in recording (e.g., a live entertainment performance). In some implementations, the user may also view and record a video reproduction on the hinged computing device concurrently with the binaural audio recording, which may later be played back with or without the binaural audio recording.

A detecting operation 315 detects an angular orientation of the hinge. In some implementations, binaural audio recording is only permitted when the hinge is oriented within a predefined range deemed acceptable for binaural recording. In other implementations, the detected angular orientation of the hinge is used in conditioning operation 330 to generate a binaural audio output. A capturing operation 320 captures one or more user face characteristics via a camera on the hinged computing device. The captured face characteristics may also be used in the conditioning operation 330 to generate the binaural audio output.

A recording operation 325 records an audio stream from the audio source. In various implementations, a first microphone within the first device component and a second microphone within the second device component records the audio stream onto the hinged computing device. In various implementations, the microphones are oriented in relation to a remainder of the hinged computing device to approximate location of a user's ears in relation to a remainder of the user's face.

A conditioning operation 330 conditions the recorded audio feed to generate or create a binaural audio stream. The hinged computing device includes a binaural processing unit that executes the conditional operation 330 on the audio feed recorded via the microphones to generate the binaural audio stream. In various implementations, the binaural processing module may adjust the binaural audio signal based on the input angular position of the hinge. This adjusting may be static or dynamic. The binaural processing module may still further compare the input angular position of the hinge to a value corresponding to a standard user's head shape or a manually input value corresponding to a specific user's head shape. In further implementations, the binaural processing module may adjust the binaural audio stream based on the user's face characteristics captured via the camera on the hinged computing device. In further still implementations, the binaural processing module may adjust the binaural audio stream based on audio source type (e.g., point source or multiple sources), style (e.g., music or ambient), distance to audio source, computing device size (e.g., laptop, tablet, or phone), device material or reflectivity of each device component (e.g., cover, type pad, or touchscreen) and may compensate for ITDs, ILDs, or other factors influencing the quality of the binaural audio stream.

An outputting operation 335 outputs the conditioned binaural audio stream to a playback device. In various implementations, the playback device is a set of headphones or a dipole stereo. The conditioned binaural audio stream may be stored on the hinged computing device or another computing device for later playback to the user or other users.

Figure 4:
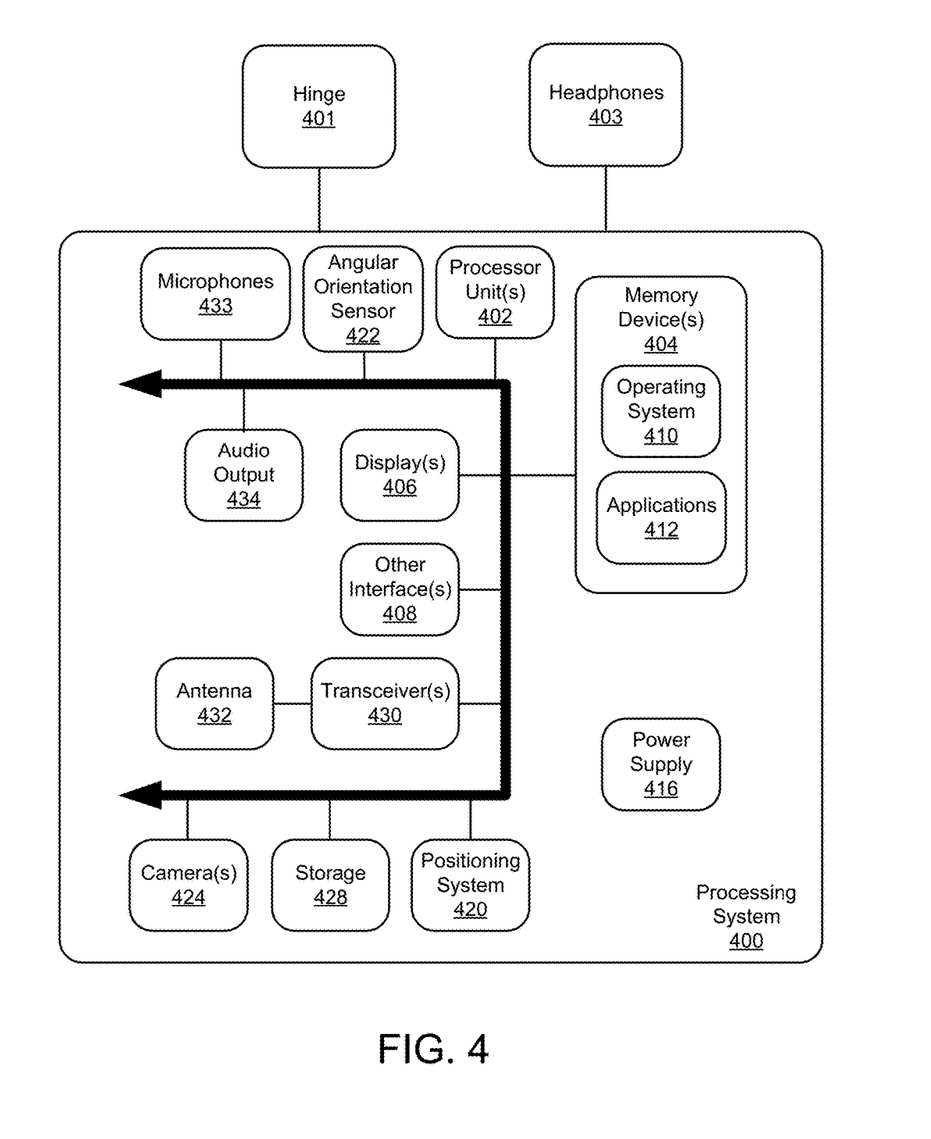
FIG. 4 illustrates an example processing system for creating a binaural recording using a hinged computing device.

FIG. 4 illustrates an example processing system 400 for creating a binaural recording using a hinged computing device. The processing system 400 may include one or more processor units 402 (e.g., discrete or integrated microelectronic chips and/or separate but integrated processor cores), at least one memory device 404 (which may be integrated into systems or chips of the processing system 400), one or more displays 406 (e.g., a touchscreen display, an organic light-emitting diode (OLED) display with photodetectors, etc.), and other interfaces 408 (e.g., keyboard and/or touchpad interfaces). The memory device(s) 404 may include one or both of volatile memory (e.g., RAM) and non-volatile memory (e.g., flash memory). An operating system 410, such as one of the varieties of the Microsoft Windows® operating system, resides in the memory device(s) 404 and is executed by at least one of the processor units 402, although other operating systems may be employed.

One or more applications 412 (e.g., a binaural audio conditioning application) are loaded in the memory device (s) 404 and executed on the operating system 410 by at least one of the processor units 402. The processing system 400 includes a power supply 416, which is powered by one or more batteries and/or other power sources, and which provides power to other components of the processing system 400. The power supply 416 may also be connected to an external power source that overrides or recharges the built-in batteries or other power sources.

The processing system 400 includes a pair of high-fidelity omnidirectional microphones 433 that approximate the ear-to-ear spacing of a dummy head and an intended user of the hinged computing device. The processing system 400 further includes an angular orientation sensor 422 that that detects an angular position of hinge 401 for creating the binaural recording. The processing system also include one or more cameras 424, at least one of which may be used to capture one or more images of the user that is used to create an estimated angle corresponding to the user's head shape.

The processing system 400 may still further include one or more communication transceivers 430 to provide network connectivity (e.g., mobile phone network, Wi-Fi®, BlueTooth®, etc.), a positioning system 420 (e.g., a global positioning satellite transceiver), other sensors (e.g., temperature sensors, attitude sensors, accelerometers, etc.), audio output(s) 434 (e.g., a headphone jack), one or more antennas 432, and additional storage 428. Other configurations may also be employed.

In an example implementation, the processing system 400 receives a recorded audio input from the microphones 433 and processes the audio stream to generate a conditioned binaural audio stream that may be stored within memory device(s) 404 or storage 428, or output via the audio output(s) 434 to headphones 403.

The processing system 400 may include a variety of tangible computer-readable storage media and intangible computer-readable communication signals. Tangible computer-readable storage can be embodied by any available media that can be accessed by the processing system 400 and includes both volatile and nonvolatile storage media, as well as removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, random-access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other tangible medium which can be used to store the desired information and which can be accessed by the processing system 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared (IR), and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

Some embodiments of the invention described herein are implemented as logical steps in one or more computer systems. The logical operations are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations described herein are referred to variously as operations, steps, objects, or modules. Furthermore, the logical operations may be performed in any order, adding or omitting operations as desired, unless explicitly claimed otherwise or a specific order is inherently necessitated by the claim language.

An example binaural computing device according to the presently disclosed technology includes a first device component including a first microphone, a second device component including a second microphone, and a binaural processing module to receive audio input from the first microphone and the second microphone and generate a binaural audio stream. The second device component is pivotally connected to the first device component and the first microphone and the second microphone are each positioned at a location of the binaural computing device distal from the pivotal connection.

Another example binaural computing device according to the presently disclosed technology further includes an angular orientation sensor that detects an angle between the first device component and the second device component for generating the binaural audio stream.

Another example binaural computing device according to the presently disclosed technology further includes a hinge pivotally connecting the first device component to the second device component. The angular orientation sensor detects an angular position of the hinge.

Another example binaural computing device according to the presently disclosed technology further includes a camera to capture one or more face characteristics for customizing the binaural audio stream for a user.

In another binaural computing device according to the presently disclosed technology, the first microphone and the second microphone are both forward-facing when the binaural computing device is oriented in a binaural audio recording position.

In another binaural computing device according to the presently disclosed technology, both of the first microphone and the second microphone are high-fidelity omnidirectional microphones.

In another binaural computing device according to the presently disclosed technology, one or both of the first device component and the second device component includes a touchscreen.

In another binaural computing device according to the presently disclosed technology, both of the first microphone and the second microphone are positioned 9 to 15 cm from the from the pivotal connection.

An example method of using a computing device to create a binaural recording according to the presently disclosed technology includes pivoting a first device component with reference to a second device component to create an angle between the first device component and the second device component, recording an audio stream from a first microphone within the first device component and a second microphone within the second device component onto the computing device, and conditioning the recorded audio stream to generate a binaural audio stream.

Another example method according to the presently disclosed technology further includes orienting the computing device such that a hinge pivotally connecting the first device component to the second device component points toward an audio source and both the first device component and the second device component angle away from the audio source, prior to recording the audio stream.

In another method according to the presently disclosed technology, orienting the computing device places the first device component 65 to 180 degrees from the second device component.

Another example method according to the presently disclosed technology further includes outputting the conditioned binaural audio stream to a playback device.

In another method according to the presently disclosed technology, the playback device is a set of headphones.

Another example method according to the presently disclosed technology further includes detecting the angle between the first device component and the second device component. Conditioning the recorded audio stream includes adjusting the binaural audio stream based on the detected angle.

Another example method according to the presently disclosed technology further includes capturing one or more user face characteristics via a camera on the computing device. Conditioning the recorded audio stream includes adjusting the binaural audio stream based on the captured user face characteristics.

An example computer-readable medium containing processor-executable instructions according to the presently disclosed technology that, when executed by a processor, cause the processor to record an audio stream from a first microphone within a first device component and a second microphone within a second device component onto a binaural computing device and condition the recorded audio stream to generate a binaural audio stream. The first device component is pivotally connected to the second device component.

In another example computer-readable medium according to the presently disclosed technology, the processor-executable instructions further cause the processor to output the conditioned binaural audio stream to a playback device.

In another example computer-readable medium according to the presently disclosed technology, the playback device is a set of headphones.

In another example computer-readable medium according to the presently disclosed technology, the processor-executable instructions further cause the processor to detect an angle between the first device component and the second device component. Conditioning the recorded audio stream includes adjusting the binaural audio stream based on the detected angle.

In another example computer-readable medium according to the presently disclosed technology, the processor-executable instructions further cause the processor to capture one or more user face characteristics via a camera on the binaural computing device. Conditioning the recorded audio stream includes adjusting the binaural audio stream based on the captured user face characteristics.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A binaural computing device comprising:
    a first device component including a first microphone;
    a second device component including a second microphone, wherein the second device component is pivotally connected to the first device component, and wherein the first microphone and the second microphone are each positioned at a location of the binaural computing device distal from the pivotal connection; and a binaural processing module to receive audio input from the first microphone and the second microphone and incorporate a head shadow corresponding to the binaural computing device to generate a binaural audio stream.

2. The binaural computing device of claim 1, further comprising:
an angular orientation sensor that detects an angle between the first device component and the second device component for generating the binaural audio stream.

3. The binaural computing device of claim 2, further comprising:
a hinge pivotally connecting the first device component to the second device component, wherein the angular orientation sensor detects an angular position of the hinge.

4. The binaural computing device of claim 1, further comprising:
a camera to capture one or more face characteristics for customizing the binaural audio stream for a user.

5. The binaural computing device of claim 1, wherein the first microphone and the second microphone are both forward-facing when the binaural computing device is oriented in a binaural audio recording position.

6. The binaural computing device of claim 1, wherein both of the first microphone and the second microphone are high-fidelity omnidirectional microphones.

7. The binaural computing device of claim 1, wherein one or both of the first device component and the second device component includes a touchscreen.

8. The binaural computing device of claim 1, wherein both of the first microphone and the second microphone are positioned 9 to 15 cm from the pivotal connection.

9. A method of using a computing device to create a binaural recording comprising:
pivoting a first device component with reference to a second device component to create an angle between the first device component and the second device component;
recording an audio stream from a first microphone within the first device component and a second microphone within the second device component onto the computing device; and
conditioning the recorded audio stream using a head shadow corresponding to the computing device to generate a binaural audio stream.

10. The method of claim 9, further comprising:
orienting the computing device such that a hinge pivotally connecting the first device component to the second device component points toward an audio source and both the first device component and the second device component angle away from the audio source, prior to recording the audio stream.

11. The method of claim 10, wherein orienting the computing device places the first device component 65 to 180 degrees from the second device component.

12. The method of claim 9, further comprising:
outputting the conditioned binaural audio stream to a playback device.

13. The method of claim 12, wherein the playback device is a set of headphones.

14. The method of claim 9, further comprising:
detecting the angle between the first device component and the second device component, wherein the conditioning the recorded audio stream includes adjusting the binaural audio stream based on the detected angle.

15. The method of claim 9, further comprising:
capturing one or more user face characteristics via a camera on the computing device, wherein the conditioning the recorded audio stream includes adjusting the binaural audio stream based on the captured user face characteristics.

16. A tangible computer-readable medium containing processor-executable instructions that, when executed by a processor, cause the processor to:
record an audio stream from a first microphone within a first device component and a second microphone within a second device component onto a binaural computing device, the first device component pivotally connected to the second device component; and
condition the recorded audio stream using a head shadow corresponding to the binaural computing device to generate a binaural audio stream.

17. The tangible computer-readable medium of claim 16, wherein the processor-executable instructions further cause the processor to:
output the conditioned binaural audio stream to a playback device.

18. The tangible computer-readable medium of claim 17, wherein the playback device is a set of headphones.

19. The tangible computer-readable medium of claim 16, wherein the processor-executable instructions further cause the processor to:
detect an angle between the first device component and the second device component, wherein the conditioning the recorded audio stream includes adjusting the binaural audio stream based on the detected angle.

20. The tangible computer-readable medium of claim 16, wherein the processor-executable instructions further cause the processor to:
capture one or more user face characteristics via a camera on the binaural computing device, wherein the conditioning the recorded audio stream includes adjusting the binaural audio stream based on the captured user face characteristics.

* * * * *